(12) United States Patent
Mangtani et al.

(10) Patent No.: US 11,341,474 B2
(45) Date of Patent: May 24, 2022

(54) SYSTEMS, DEVICES, AND METHODS FOR NETWORK MANAGEMENT AT A POINT OF SALE (POS) DEVICE

(71) Applicant: PredictSpring, Inc., Los Altos, CA (US)

(72) Inventors: Nitin Mangtani, Los Altos, CA (US); Viswanth Chadalawada, San Jose, CA (US); Seeniraj Kamaraj, San Jose, CA (US)

(73) Assignee: PredictSpring, Inc., Los Altos, CA (US)

( * ) Notice: Subject to any disclaimer, the term of this patent is extended or adjusted under 35 U.S.C. 154(b) by 0 days.

(21) Appl. No.: 17/337,633

(22) Filed: Jun. 3, 2021

(65) Prior Publication Data

US 2021/0383343 A1 Dec. 9, 2021

Related U.S. Application Data

(60) Provisional application No. 63/034,159, filed on Jun. 3, 2020.

(51) Int. Cl.
*G06Q 20/20* (2012.01)
*G06Q 20/38* (2012.01)

(52) U.S. Cl.
CPC ......... *G06Q 20/202* (2013.01); *G06Q 20/204* (2013.01); *G06Q 20/209* (2013.01); *G06Q 20/3827* (2013.01)

(58) Field of Classification Search
CPC .. G06Q 20/202; G06Q 20/204; G06Q 20/209; G06Q 20/3827
See application file for complete search history.

(56) References Cited

U.S. PATENT DOCUMENTS

| | | | |
|---|---|---|---|
| 9,268,562 B1 * | 2/2016 | Mangtani | H04M 1/724 |
| 9,741,035 B1 * | 8/2017 | White | G06Q 20/405 |
| 2007/0078950 A1 | 4/2007 | Hopkins et al. | |
| 2015/0262174 A1 | 9/2015 | Mongillo, III et al. | |
| 2019/0213569 A1 | 7/2019 | Hosp et al. | |

OTHER PUBLICATIONS

International Search Report and Written Opinion in International Patent Application No. PCT/US2021/035593 dated Aug. 31, 2021, 13 pages.

* cited by examiner

*Primary Examiner* — A. Hunter Wilder
*Assistant Examiner* — Joseph M Mutschler
(74) *Attorney, Agent, or Firm* — Smith Baluch LLP

(57) ABSTRACT

Systems, devices and methods directed to operation of a point of sale (PoS) device during network connectivity to a cloud server, as well as during network outages and/or interruptions. The POS device can process transactions in a seamless manner even during network outages and/or interruptions. A POS application that runs on a POS device in an "online" mode can automatically detect an interruption in network connectivity, and switch to an "offline" mode. In the offline mode, the POS device can continue to process transactions and/or conduct other activities.

33 Claims, 10 Drawing Sheets

| Label ↑ | Key | Location of Setting |
|---|---|---|
| Support Offline Mode | Offline | Modules > POS |

Rows per page: 10 ▼    1-1 of 1  < >

FIG. 3A

Offline Configuration

General Settings

310 — ⬤ Enable offline mode

Offline Database Refresh Time*

315 — [ 3600 ]

Elapsed time in seconds before forcing an update to the offline database before switching to online mode

Maximum Allowances

Transaction amount*

320 — [ 500 ]

Max limit per transaction amount while offline

Daily transactions amount*

325 — [ 5000 ]

Max total amount per day while offline (all transactions)

Percent off price override*

330 — [ 100 ]

Max percentage off on overrides while offline

Offline Detection

Start Online Detection*

335 — [ 30 ]

Elapsed time in seconds before starting online detection after switching to offline mode

FIG. 3B

SYSTEMS, DEVICES, AND METHODS FOR NETWORK MANAGEMENT AT A POINT OF SALE (POS) DEVICE

CROSS-REFERENCE TO RELATED APPLICATIONS

This application claims priority to U.S. Provisional Application No. 63/034,159 filed Jun. 3, 2020 and titled "SYSTEMS AND METHODS FOR RENDERING AN APPLICATION WITH A DYNAMIC USER INTERFACE THAT ENABLES SEAMLESS EXPERIENCE AT A POINT OF SALE DURING NETWORK INTERRUPTIONS", the entire disclosure of which is incorporated herein by reference.

BACKGROUND

Point of sale (POS) devices and systems provide retail stores with a range of administrative, marketing, and management features. A conventional POS setup in a retail store usually includes a POS device (e.g., a tabletop computing device or terminal) that interacts via the store's local area network (LAN), Wi-Fi network, etc. with a central server that also resides in the store. The server, in turn, communicates with devices external to the stores to execute transaction processing, etc. However, such conventional POS systems are prone to communication and/or device breakdowns that in turn can lead to interruptions and errors in sales transactions, and adversely affect store revenue. For instance, in the event of a LAN outage or interruption that typically and frequently occurs in retail store settings, a POS device can slow down and/or be unable to process transactions. As another example, the store's central server may lose connectivity with a payment gateway and/or a server that verifies transactions. As yet another example, during times of increased traffic on a retail website and/or POS application associated with the retail store (e.g., hosted by the store's central server), operation of the POS device can slow down and/or be otherwise adversely affected.

As a result of any of these network/connectivity issues, a slowdown and/or a complete inability to process transactions can lead to transactional errors (e.g., the wrong price may be applied, the inventory information may be outdated, other synchronization issues with remote servers/databases, etc.) that in turn can cause significant financial loss to the store. Another aspect of such an interruption of transactional processing can be high customer dissatisfaction with slow or failed transactions.

SUMMARY

There is an unmet need for modern point of sale (POS) systems that can process transactions even during network outages and interruptions. Additionally, there is an unmet need for modern POS systems that do not require in-store components (e.g., a server physically disposed within the store to interface with the POS) and can communicate directly with remote servers, cloud-based services, etc.

In some aspects, in a system including cloud server and a payment device, a point-of-sale (POS) device is communicably coupleable to the cloud server and to the payment device and includes a database and a processor. The processor executed a POS application that is configured to, in an online mode during which the POS device is communicably coupled to the cloud server, receive a configuration file and an offline packet from the cloud server. The configuration file includes layout information, and the offline packet including a first portion of product information associated with a set of products. The POS device is also configured to, in the online mode, render a dynamic user interface on a display of the POS device based on the configuration file and the offline packet. The rendering can include rendering a portion of the dynamic user interface by requesting, from the cloud server, a second portion of the product information associated with the set of products; receiving, from the cloud server, the second portion of the product associated with the set of products; and rendering the portion of the dynamic user interface based on the first portion of the product information and the second portion of the product information. The POS device is also configured to, in the online mode, detect loss or reduction in extent of communicable coupling with the cloud server, and enter an offline mode in response to the detecting the loss or reduction in extent of communicable coupling with the cloud server. The POS device is also configured to, in the offline mode, re-render the dynamic user interface as a static user interface based on the configuration file, the offline packet, and the first portion of the product information, such that no requests for additional portions of the product information are made to the cloud server when the POS device is in the offline mode. The POS device is also configured to, in the offline mode, execute, in concert with the payment device, at least one transaction associated with a first product of the set of products to generate transaction completion information, and store the transaction completion information in the database. The POS device is further configured to detect restoration or increase in extent of communicable coupling with the cloud server, and to re-enter the online mode in response to the detecting the restoration or increase in extent of the communicable coupling with the cloud server. The POS device is further configured to transmit the transaction completion information to the cloud server for synchronization.

In some aspects, a method of a POS device communicably coupleable to a cloud server and to a payment device includes, in an online mode during which the POS device is communicably coupled to the cloud server, receiving a configuration file and an offline packet from the cloud server. The configuration file includes layout information, and the offline packet including a first portion of product information associated with a set of products. The method further includes, in the online mode, rendering a dynamic user interface on a display of the POS device based on the configuration file and the offline packet. The rendering can include rendering a portion of the dynamic user interface by requesting, from the cloud server, a second portion of the product information associated with the set of products; receiving, from the cloud server, the second portion of the product associated with the set of products; and rendering the portion of the dynamic user interface based on the first portion of the product information and the second portion of the product information. The method further includes, in the online mode, detecting loss or reduction in extent of communicable coupling with the cloud server, and enter an offline mode in response to the detecting the loss or reduction in extent of communicable coupling with the cloud server. The method further includes, in the offline mode, re-rendering the dynamic user interface as a static user interface based on the configuration file, the offline packet, and the first portion of the product information, such that no requests for additional portions of the product information are made to the cloud server when the POS device is in the offline mode. The method further includes, in the offline mode, executing, in concert with the payment device, at least one transaction associated with a first product of the set of products to generate transaction completion information, and store the transaction completion information in the database. The method further includes detecting restoration or increase in extent of communicable coupling with the cloud server, and to re-enter the online mode in response to the detecting the restoration or increase in extent of the communicable coupling with the cloud server. The method further includes transmitting the transaction completion information to the cloud server for synchronization.

In some aspects, a non-transitory computer-readable medium stores instructions of a point-of-sale (POS) device communicably coupleable to a cloud server and to a payment device that, when executed by one or more processors, cause the one or more processors to, in an online mode during which the POS device is communicably coupled to the cloud server, receive a configuration file and an offline packet from the cloud server. The configuration file includes layout information, and the offline packet including a first portion of product information associated with a set of products. The instructions when executed further cause the one or more processors to, in the online mode, render a dynamic user interface on a display of the POS device based on the configuration file and the offline packet. The rendering can include rendering a portion of the dynamic user interface by requesting, from the cloud server, a second portion of the product information associated with the set of products; receiving, from the cloud server, the second portion of the product associated with the set of products; and rendering the portion of the dynamic user interface based on the first portion of the product information and the second portion of the product information. The instructions when executed further cause the one or more processors to, in the online mode, detect loss or reduction in extent of communicable coupling with the cloud server, and enter an offline mode in response to the detecting the loss or reduction in extent of communicable coupling with the cloud server. The instructions when executed further cause the one or more processors to, in the offline mode, re-render the dynamic user interface as a static user interface based on the configuration file, the offline packet, and the first portion of the product information, such that no requests for additional portions of the product information are made to the cloud server when the POS device is in the offline mode. The instructions when executed further cause the one or more processors to, in the offline mode, execute, in concert with the payment device, at least one transaction associated with a first product of the set of products to generate transaction completion information, and store the transaction completion information in the database. The instructions when executed further cause the one or more processors to detect restoration or increase in extent of communicable coupling with the cloud server, and to re-enter the online mode in response to the detecting the restoration or increase in extent of the communicable coupling with the cloud server. The instructions when executed further cause the one or more processors to transmit the transaction completion information to the cloud server for synchronization.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3A is an example interface illustrating enabling/disabling of offline mode operation for a POS application.

FIG. 3B is an example interface illustrating settings for a POS application.

DETAILED DESCRIPTION

Conventional point of sale (POS) devices, during network outages and interruptions, typically do not function in a seamless manner, and can require additional software and/or hardware to mitigate the effects of such interruptions on transaction processing in retail settings. For instance, some point of sale systems use a local server that is housed in-store to process at least some transactions in the event of network outages. Described herein are POS devices, and methods thereof, that can communicate directly with a cloud server and/or other remote device without the need for an in-store server, and can conduct transactions and perform other retail activities even during a network outage and/or other loss of network connectivity. Removing the requirement for an in-store server reduces cost and computational overhead, as well as another point of failure in the day to day operations of the store.

POS System

Figure 1:
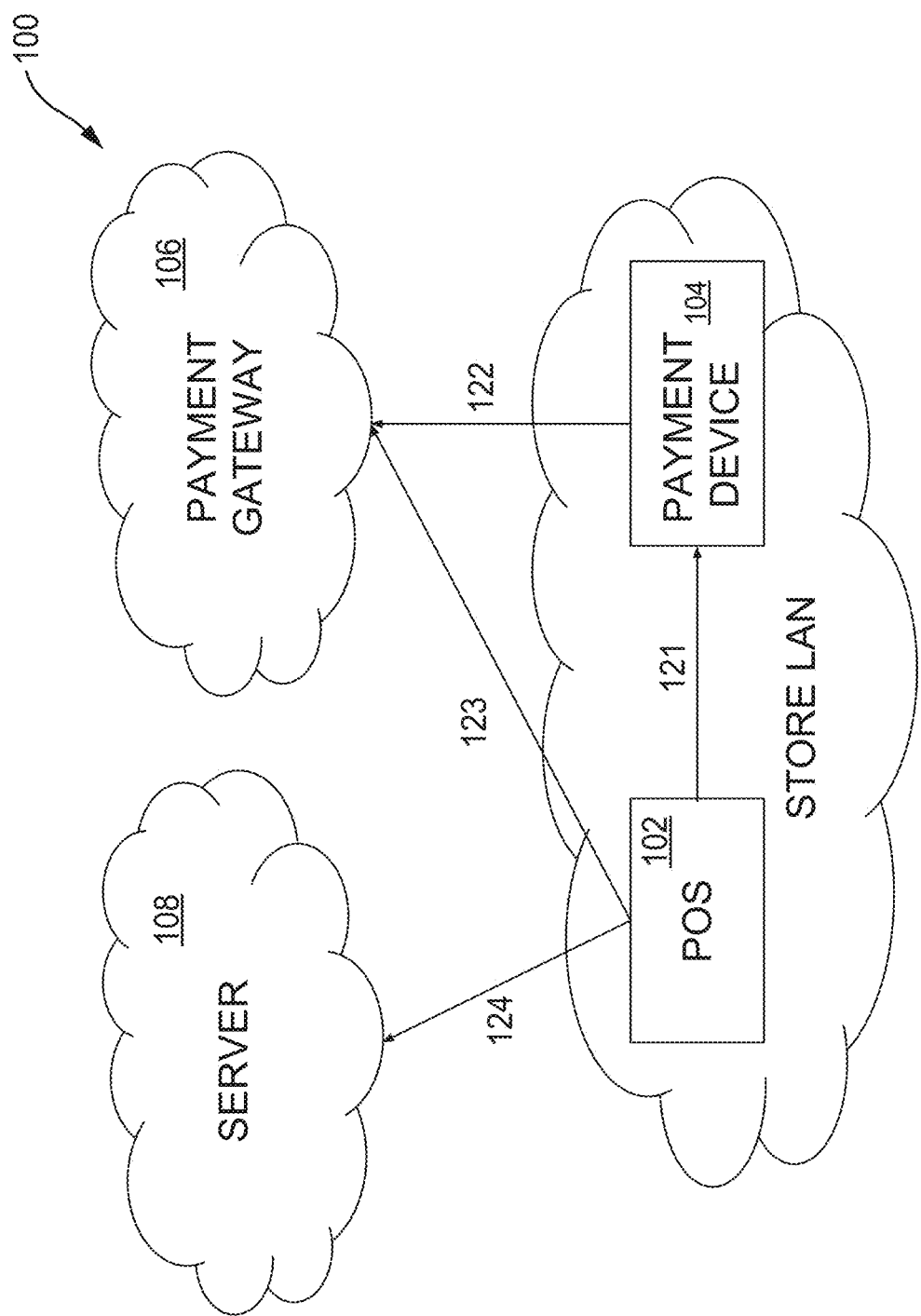
FIG. 1 illustrates an inventive point of sale (POS) system including a POS device.

FIG. 1 illustrates an example POS system 100 that can offer a seamless transaction experience to retailers and customers alike. System 100 includes a POS device 102, a payment device 104, a payment gateway 106, and a server/cloud device 108. As also illustrated in FIG. 1, the POS device 102 can be communicatively coupled to the payment device 104 via a link 121, optionally to the payment gateway via a link 123, and to the server 108 via a link 124. The payment device 104 is also directly and communicatively coupled to the payment gateway 106 via a link 122. In some cases, the POS device 102 and the payment device 104 can be a single device, i.e., the combined POS-payment device can have the functionality of the each of these devices as disclosed herein, and be communicably coupled to both the server 108 via the link 124 as well as the payment gateway 106 via the link 122.

The POS device 102 can generally be any suitable device usable by a store associate to execute a transaction with a customer. In some cases, the POS device 102 is a mobile device that permits the store associate to easily move around the retail store and execute transactions where the customer(s) is found, rather than requiring the customer to approach a conventional checkout kiosk or other fixed location within the store. Some non-limiting examples of a POS device 102 can include appropriately configured mobile devices and smart phones (e.g., Apple iPhone®, Samsung Galaxy®, Google Pixel®, etc.), computers (e.g., desktops, personal computers, laptops etc.), tablets (e.g., Apple iPad®, Samsung Galaxy® Tab, Microsoft Surface®, Amazon Kindle®, etc.), e-readers, and/or the like.

The POS device 102 can include a processor. In some implementations, such a processor can be a central processing unit (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory, such as a memory or cache (e.g., registers, cache memory, random access memory, etc.), a database, and/or the like. Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations.

The instruction codes can be accessed from the on-device cache to execute software programs on the POS device 102. These software programs can include a POS application (e.g., a mobile application, a cloud-based application, etc.). The POS application can be downloaded on the POS device 102 from the server 108 (which can be a server executing, for example, a Microsoft Azure®, Amazon® web services, IBM® cloud computing, etc.). In some implementations, the POS application can be downloaded on the POS device 102 from a digital distribution platform, such as an app store (e.g., Google Play, Chrome® web store, Apple® iTunes, etc.). Unless expressly noted otherwise, functionality imputed herein to the POS device 102 can refer to functionality of the POS application. The POS application can generally be an application where a customer can execute, and/or a store associate can execute upon customer request, a transaction for one or more products and/or services. As such, the POS application can provide any suitable functionality for executing such a transaction such as, but not limited to, the ability to search/browse/scan/manually enter a product, add products to a shopping cart, checkout the products in the shopping cart, compile cost information for the products, compile sales tax information for the products, account for promotional codes/coupon codes, compile total transaction information, communicate with payment systems to facilitate payment, provide an indication of completion or failure of the transaction to the customer and/or store associate, and/or the like.

The POS application can render a POS user interface on a display or touchscreen of the POS device 102. In some cases, the POS application can be configured such that the POS user interface encompasses one or more container elements, and that the container elements are populated wholly or partly based on a mobile configuration file received from the server 108, as explained in greater detail later. In this manner, the layout and/or content of the user interface can be wholly or partly dynamic in nature. For example, the POS user interface can be completely personalized in a manner such that it is different for different customers. For example, based on a customer profile and/or preference, the POS user interface can display different catalogs, different products, different product prices, and/or the like. This can make the user interface different for each customer. In a similar manner, the user interface can provide different catalogs, products, and/or prices for different stores.

The store associate (also sometimes referred to as an "employee") can access data related to products and/or customers via the dynamic, POS user interface. The dynamic user interface can include one or more input components that enable the store associates and/or the customers to input data regarding customer preferences (e.g., via a personalized quiz, feedback form, etc.). The dynamic user interface can render personalized content to customers based on their preferences and/or interests. The data rendered on the user interface can be partly or wholly obtained from the cloud server 108, as described in greater detail herein.

The link 124 coupling the server 108 with the POS device 102 can include one or more networks such as, for example, a local area network (LAN), a wide area network (WAN), a virtual network, a telecommunications network, a cellular network, and/or the Internet, implemented as a wired network and/or a wireless network, including combinations thereof. As an example, the POS device 102 can directly communicate with the server 108 via a cellular network. As another example, the POS device 102 can communicate with the server 108 via a combination of a store LAN and the Internet. Any or all communications between the cloud server 108 and the POS device 102 can be secured (e.g., encrypted) or unsecured, as is known in the art.

The link 121 coupling the POS device 102 with the payment device 104 within the retail store can include, for example, a direct connection (e.g., a cable), a networked wireless connection (e.g., the store LAN and/or Wi-Fi) and/or a direct wireless connection (e.g., Bluetooth). The payment device 104 can generally include a card reader, such as the Square® credit card reader, Ingenico® credit card reader, and/or the like, that can interface with payment cards such as credit cards, debit cards, and/or gift cards, to make electronic fund transfers. The interface can include a magnetic strip reader, near-field communication, and/or the like. In some cases, the payment device 104 can transmit the payment card information to the POS device 102. The payment device 104 can transmit the payment card information to the payment gateway 106 for execution of the payment/transaction.

The payment gateway 106 can be any suitable device or system to facilitate a payment/transaction based on the received payment card information. The link 122 between the payment gateway 106 and the payment device 104 and/or the optional link 123 between the payment gateway 106 and the POS device 102 can include one or more networks such as, for example, a local area network (LAN), a wide area network (WAN), a virtual network, a telecommunications network, a cellular network, and/or the Internet, implemented as a wired network and/or a wireless network, including combinations thereof. In some cases, the payment gateway 106 serves as a conduit for transmitting the payment/transaction information to a device of a bank that in turn executes the payment. The payment gateway 106 can be associated with the payment device 104 and can be provided by a merchant service to facilitate authorization of credit card, debit card, and direct payment processing for retail stores and/or brands. Some non-limiting examples of payment gateway 106 can include Adyen®, Paypal®, Square®, and/or the like.

Online Operation

Figure 2:
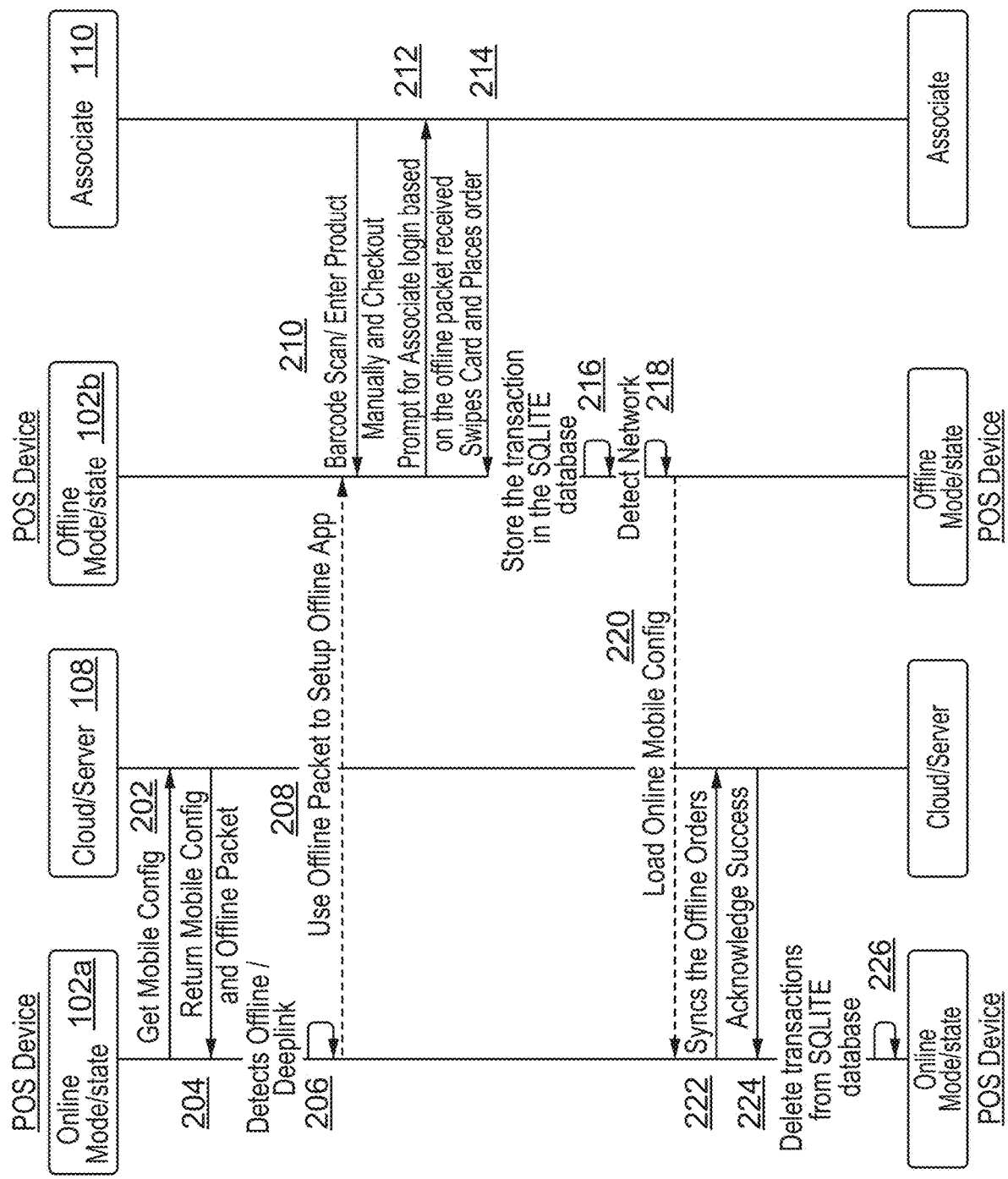
FIG. 2 is a flow diagram showing the operation of various components of the POS system in FIG. 1, including interaction with a store associate, during network outages and interruptions.

FIG. 2 is a flow diagram showing how the POS device 102 running the POS application can operate in two modes—an online mode 102a and an offline mode 102b. The POS device 102 running the POS application can communicate with the cloud/server 108 in the online mode 102a. An associate 110 associated with a store can access the POS device 102 both during the online mode 102a (as explained above, not shown in FIG. 2) and in the offline mode 102b as illustrated.

Explained herein is operation of the system 100 during online operation, i.e., during complete and/or satisfactory network connectivity/communicable coupling between at least the POS device 102 and the cloud server 108.

The POS device 102 in FIG. 1 can download and install the POS application from the server 108 and/or a web store (not shown). The POS application can be configured to render a dynamic user interface on the POS device 102 in order to provide a personalized experience to a customer. This initial download of the POS application can also include a configuration file (sometimes referred to as a "config file" or "mobile config"), trigger a download of the configuration file, and/or the like. The configuration file can define and/or include parameters and initial settings for rendering the dynamic user interface on the POS device 102.

For example, the POS application can be configured to determine the layout for the user interface by processing the configuration file, i.e., the layout information in the configuration file. The configuration file can include a data structure as well as a layout settings executable object that can cause the POS device 102 to render the user interface on the POS device 102. This data structure can include multiple layouts and multiple configuration settings. The data structure can be configured to instruct the POS application to render the user interface on a display of the POS device based on an execution of the layout settings executable object. The layout settings executable object can be, for example, a JavaScript Object Notation (JSON) object executable by the POS device 102.

The executable object can specify settings and/or features of the POS application. The settings can include color settings, image display settings, font settings, search layout settings, grid layout settings, shopping cart settings, and/or update settings. The features of the mobile application can be specified via feature flags in the layout settings executable object, and can include at least one of a barcode feature, a notifications feature, a search refinement feature, a ratings feature, a checkout feature, a store locator feature, and/or the like.

The configuration file can be developed, installed, and updated together or separately from the POS application. Put differently, updating the configuration file does not cause changes to the underlying code of the POS application. As a non-limiting example, the configuration file can be a JavaScript Object Notation (JSON) and/or the like. Aspects of the configuration file may be similar to those disclosed in U.S. Pat. No. 9,268,562, the entire disclosure of which is incorporated herein by reference.

The initial download of the POS application can also include or trigger download of application data that is to be rendered to the user via the dynamic user interface, and is generally used to set up or prepare the POS application for offline mode operation when required. For example, in a retail setting, the application data can include product information (sometimes also referred to as the first portion of product information, generally characterized as any product information included in the application data) such as product names, product cost, and/or the like. In some cases, product information that has a relatively larger file size, such as product images (but applicable to any other product information that may exceed some predetermined file size, or be specified as such), are not included in the application data but are downloaded in real-time when accessed, during the online mode (sometimes also referred to as the second portion of product information, generally characterized as any product information downloaded upon demand and in real-time during the online mode, and unavailable in the offline mode unless previously downloaded). In this manner, the initial download of the application data can be made lightweight, with the more bandwidth-intensive downloads, such as product images, carried out on an on-demand basis in online mode. In some cases, the initial download of the application data can include the product images.

The application data can also include transaction information that is required or desirable for estimating product cost such as, for example, sales tax information for the area where the retail store is located, discount information, promotional codes, tax exemption information, shipping rate information for different zip codes, return policy information for a given product, and/or the like.

Example product information for each product can include, but is not limited to, a unique product identifier, a product name/title, a SKU (stock keeping unit) identifier for the product, the amount or quantity of the product available at the store associated with the POS device 102 or otherwise available to purchase, a list price for the product, an optional sale price for each product, a product color, a product size, a tax classification for that product, and/or the like.

The product information (also sometimes referred to herein as "full product list", "full product feed" and/or "full product file") can also include metadata such as, for example, number of product records, size of data downloaded, time taken to download data, time taken to insert products to a local database stored in the POS device 102, etc.

The initial download of the POS application can also include or trigger download of policy data (also sometimes referred to as "credentials") that is associated with usage of the POS application and/or the POS device 102. The policy data can include, for example, user credentials such as user account information (usernames, passwords, and/or the like) associated with one or more users of the software and/or the POS device 102. For example, the policy data can include account information for a store manager of the store associated with the POS device 102 and also for multiple store associates. The policy data can also include privilege information for each account such as, for example, an indication that only a store manager can edit the product cost information for a particular product during a transaction at the POS device 102, an indication that all returns require store manager authorization, and/or the like. In some cases, when the POS application is initiated for the first time on the POS device 102, the dynamic user interface is presented to the user after complete download of the mobile configuration file, the application data, and the policy data.

FIG. 2 illustrates how, when the POS device 102 is initially online (e.g., when the POS device 102 first begins communicating with the server 108, and maintains such connectivity), the POS application can be initiated, or downloaded and initiated on the POS device 102. A notification can be sent to the server 108, indicating that the POS application has been initiated or launched at the POS device 102. At 202, the POS application can submit a request to the cloud server 202 for the configuration file. For example, the POS device 102 can interact with/call one or more application programming interfaces (APIs) of the cloud server 108 to submit the request. Example APIs that can be initiated during this initial online operation for retrieving the product information are listed in Table 1.

TABLE 1

| API | Purpose |
| --- | --- |
| GET/v1/offline/products/full/generate | The POS device requests that the cloud server generate a new/updated product list for offline usage. In response, the cloud server generates the new/updated product list |
| GET/v1/offline/products/full | The POS device requests a file handle from the cloud server for the new/updated product list |
| GET/v1/offline/products/full/stream | The POS device retrieves the new/updated product list using the file handle, e.g., one record at a time for the product list |

Following this initiation, at 204, the cloud server 108 can return the configuration file with the layouts setting executable object. The cloud server 108 also returns the application data and the policy data, sometimes collectively referred to as an "offline packet". The POS application can then generate the dynamic POS user interface for the store associate on the POS device 102 based on the configuration file and the offline packet, and in turn enable the associate to execute transactions associated with the displayed product information for a customer. The configuration file and the offline packet can be stored in a database on the POS device 102 (e.g., an SQLite™ database) or coupled thereto.

In some cases, when in the online mode 102a, some or all portions of the application data can be periodically refreshed, synchronized, and/or otherwise updated at the POS device 102 by the server 108. In some cases, the frequency of synchronization can be the same for all the application data such as, for example, every 5 minutes, every 10 minutes, every 15 minutes, every hour, every 2 hours, every 6 hours, including all values and sub-ranges in between. In some cases, the frequency of synchronization can be different for different information in the application data such as, for example, every 5 minutes for the product information, every 5 days for sales tax rates, and/or the like. In this manner, the extent of synchronization can be optimized based on the nature and/or criticality of the information being synchronized.

In some cases, when in the online mode 102a, and despite the configuration file, application data, and policy data being available locally on the POS device 102, the POS device continues to communicate with the cloud server 108 for aspects of its operation such as to render the dynamic POS user interface, to carry out a transaction, and/or the like. As an example, when a sales associate clicks on a product image on the dynamic POS user interface to view detailed product information and price, the POS device 102 retrieves the latest product price and/or text description from the server 108, even though that information may be locally available. As noted herein, the product image itself may only be available in online mode, and/or if previously downloaded. In this manner, the POS device 102 can ensure that transaction-critical information such as product price is always up to date at the time of a transaction. On the other hand, for product images (or generally, any suitable second portion of the product information) that have a large file size and can be more network bandwidth-intensive to retrieve repetitively, the stored version from previously received application data can be employed. As yet another example, the POS device 102 can always retrieve the latest sales tax information for a transaction even though that information can be locally available. In some cases, for such information that is both locally available but is nonetheless retrieved from the server 108 everything it is required, the local information can be updated with the latest retrieved information (e.g., the locally stored product price can be updated by the latest product price retrieved from the server).

As noted, when the POS application is initiated for the first time on the POS device 102, the dynamic POS user interface can be presented to the user only after complete (initial) download of the mobile configuration file, the application data, and the policy data. While this initial download can be of a sizeable nature (e.g. for up to a million stock keeping units (SKUs), or even more), it can be required for the very first rendering of the dynamic POS user interface. In some cases, a subsequent update to the offline packet, i.e., the application data (e.g., the product catalog is updated), and/or the policy data (e.g., a change in user settings for the store manager) can be provided by the server 108 to the POS device 102 as incremental updates, rather than as a single update. Additionally or alternatively, the update(s) can reflect the updated portion, rather than encompass all of the application data and/or policy data, e.g., can include on the order of hundreds-thousands of SKUs as updated product information. Consider that typical product information associated with a single SKU can be about 1-2 kilobytes in size, while each image associated with that SKU can be from 100 kb-2 MB or more in size, and there are typically multiple images associated with each SKU/product.

As an example, information related to new products made available for purchase can be transmitted from the server 108 to the POS device 102 one record at a time (i.e., as an incremental update), and only the information for the new products need be transmitted. In this manner, network bandwidths demands on the link 124 are reduced. Similarly, any changes to the configuration file on the server 108 can be communicated to the POS device 102 as a new configuration file or as an update to the configuration file. The POS application can process the update(s) to render an updated POS user interface on the POS device 102.

As one example, the server 108 can transmit, to the POS device 102, an indication of one or more updates to the offline packet for the POS device. When such an indication is received, the POS application can initiate one or more APIs that can retrieve the delta/update files (i.e., the update(s) to the initial offline packet) with a delta product list for the retail store and/or brand. In some cases, the POS application can initiate the request for an update to the offline packet, and/or any portion thereof.

Example APIs of the cloud server that are initiated to retrieve the updates to the product information are listed in Table 2.

TABLE 2

| API | Purpose |
| --- | --- |
| GET/v1/offline/products/delta/generate?ts=n | The POS device requests the cloud server to generate an incremental/delta product list based on a timestamp of the request. The cloud server is aware of the content of the offline packet, and generally of the content residing on the POS device, so is aware of what to include in the delta product list |
| GET/v1/offline/products/delta/list?ts=n | The POS device requests, and receives, from the cloud server, a list of file references to the delta. product Fist Each file reference can correspond to a single product within the delta product list. |
| GET/v1/offline/products/delta?ts=n | The POS device requests, and receives, from the cloud server, a single file reference to the delta product list. |
| GET/v1/offline/products/delta/stream?ts=n | The POS device uses the single file reference/list of file references to extract the delta product list. The POS device can monitor the median bandwidth (e.g., of the last 30 minutes) of its connection with the server, and use this information to determine the rate, and other factors, for streaming the delta product list |

In some cases, the updates to the configuration file and/or the offline packet can be pushed from the server 108 to the POS device 102 continuously (e.g., as a stream), periodically, upon any updates to the configuration file and/or the offline packet, and/or on-demand. In addition or alternatively, the POS device 102 can ping the server 108 for such updates periodically and/or on-demand such as, as explained above, at the time of a transaction being processed. The POS device 102, upon receiving the updated configuration file and/or the updated offline packet, can re-render the dynamic user interface in real-time in the online mode, such as to update the layout based on the updated configuration file, remove or add product listings based on the updated offline packet, and/or the like.

The POS device 102 and/or the server 108 can monitor the link 124 to evaluate one or more link parameters to determine, for example, whether the POS device 102 is online, to determine whether an update to the configuration file and/or the offline packet should be transmitted, to determine (for an update to the offline packet) the number, frequency, and/or timing of incremental updates to be transmitted, and/or the like. The link parameters can include, but are not limited to, link bandwidth, link load, link error rate, and/or the like. For example, the link bandwidth can be monitored to determine whether it is above or below some predetermined link bandwidth threshold, the link load can be monitored to determine whether it is above or below some predetermined link load threshold, the link error rate can be monitored to determine whether it is above or below some predetermined error rate threshold, and/or the like. The link parameters can be for any portion of the link 124 such as, for example, including an Internet portion of the link 124 and not including a store LAN or store Wi-Fi portion of the link 124. In some cases. the POS device 102 can ping the server 108 to evaluate the one or more link parameters for the link 124 based on a latency or delay associated with the ping.

The POS device 102 can execute one or more transactions (e.g., for a product purchase) by transmitting transaction information, such as a total cost of the transaction, to the payment device 104 via the link 121, which in turn can execute the transaction in concert with the payment gateway 106. If the payment device 104 is unavailable and/or the link 121 is inoperable, the POS device 102 can transmit the transaction information directly to the payment gateway 106 via the link 123. If the link 123 is also inoperable and/or the payment gateway 106 is also unavailable, the POS device 102 can periodically re-attempt transmission of the transaction information to the payment device 104, to the payment gateway 106, or both, until one or both devices responds to the transmission. In some cases, if the link 123 is also inoperable and/or the payment gateway 106 is also unavailable, the POS device 102 can be configured to permit the sales associate to manually enter the payment information (e.g., credit card information), which is then encrypted (e.g., to satisfy PCI or other compliance requirements) and stored locally. Once communication with the gateway 106 is restored, the POS device 102 can communicate directly with the gateway to transmit and execute the payment.

As an example of how such a transaction can generally be executed, a store associate can interact with a customer and the POS device 102 to select one or more products that the customer wishes to purchase. The selection of the product(s) can be made by searching and selecting the product via the interface of the POS device 102. In some cases, the POS device 102 includes a camera and/or scanner that can be used to scan a code (e.g., a bar code, a QR code, and/or the like) of an in-store product, which in turn can be used by the POS device 102 to retrieve the product information for the transaction. At least a portion of the product information can be retrieved directly from the server 108 when online, even when that portion of the product information is locally available at the POS device 102. For example, the product images can be retrieved locally, while the product description, cost, tax information, etc. can be retrieved from the server 108.

Once the product selection is complete, the POS device 102 can transmit the transaction information to the payment device 104 and/or the payment gateway 106 for execution, and receive an indication or confirmation that the transaction was executed, i.e., that payment information was received and executed at the payment device 104 and/or the payment gateway 106. The POS device 102 can then generate transaction completion information for that transaction that includes, for example, product information for the product(s) purchased by the customer, an amount of the transaction, a unique transaction identifier, any payment information (e.g., a unique payment identifier) received from the payment device 104 and/or the payment gateway 106, and/or the like. The transaction completion information can be locally stored, such as in an SQLite™ database of the POS device 102. The stored transaction completion information can be encrypted in compliance with Sarbanes-Oxley Act (SOX) and/or the Payment Card Industry (PCI) Security Standards Council regulations. When online, the POS device 102 can transmit the transaction completion information to the server 108 in real-time, periodically (e.g., as a batch of transactions), and/or upon request from the server.

If the POS device 102 can communicate the transaction information to the payment device 104 but the payment gateway 106 is unavailable, the payment device 104 can have its own protocol for managing communications with the payment gateway 106 such as by, for example, storing the transaction information for later transmission to the payment gateway. The POS device 102 can be abstracted from this protocol, and receive an indication of transaction execution from the payment device 104 in response to transmitting the transaction information to the payment device and without any regard to the operating status of the payment gateway 106 and/or the link 122.

Referring again to how synchronization is performed between the cloud server 108 and the POS device 102, consider that in some cases, whenever the cloud server receives or is provided updated product information to provide to the POS device 102, the cloud server can generate a full product file with an associated timestamp of generation, and also generate a hash value (e.g., by applying an MD5 hash, though any suitable hashing technique can be employed) for the generated full product file. Whenever the server 108 transmits or is requested to provide a full product file to the POS device 102 (e.g., for offline usage), the cloud server 108 can optionally send the hash value (also sometimes referred to as a first hash value or a second has value) corresponding to the last full product file that the cloud server has received.

If this is the first time the POS application is receiving/requesting the full product file, the POS file can save the hash value to its local database (e.g., an SQLite™ database), and then proceed to request and save the full product file as described herein. In some cases, once the POS application receives the full product file, it can compute, using the same hashing technique, a second hash value (also sometimes referred to as the other of the first hash value or the second has value) for the file. If the second and prior/first hash value match, the POS application can deem the transfer of the full product file to be successful, and can optionally notify the cloud server 108. In some cases, the POS application can transmit the second hash value to the server 108, and the server 108 can compare the two hash values to determine whether the transfer was successful or corrupted.

In some cases, an updated version of the full product file is to be transmitted to the POS device 102 by the server 108 (e.g., upon request by the POS device). For example, in some cases, the POS device 102 can download and install the POS application (e.g., from a digital distribution platform, such as the iOS app store, the Android Market, etc.) with an initial copy of the full product file. Depending on the version and version date of the POS application, the initial copy of the full product file can be outdated. If so, the POS device/application can request an updated version of the full product file after installation of the POS application. In such cases, the server 108 can transmit the hash value and the timestamp for the latest full product file to the POS device 102. The POS device 102 can then compare the hash value and/or the timestamp against the last hash value and/or the last timestamp received from the server 108. If the hash and/or timestamp values match, it indicates that there are no changes to the full product file previously received by the POS device 102, so the POS device 102 will not invoke the cloud server API to extract the full product file. In this manner, the use and exchange of hash values can be exploited to further reduce network traffic between the server 108 and the POS 102. The full product file can be used to replace the previously received product information (i.e., the previously received first portion of the product information) and update the dynamic user interface accordingly.

Figures 4A, 4B:
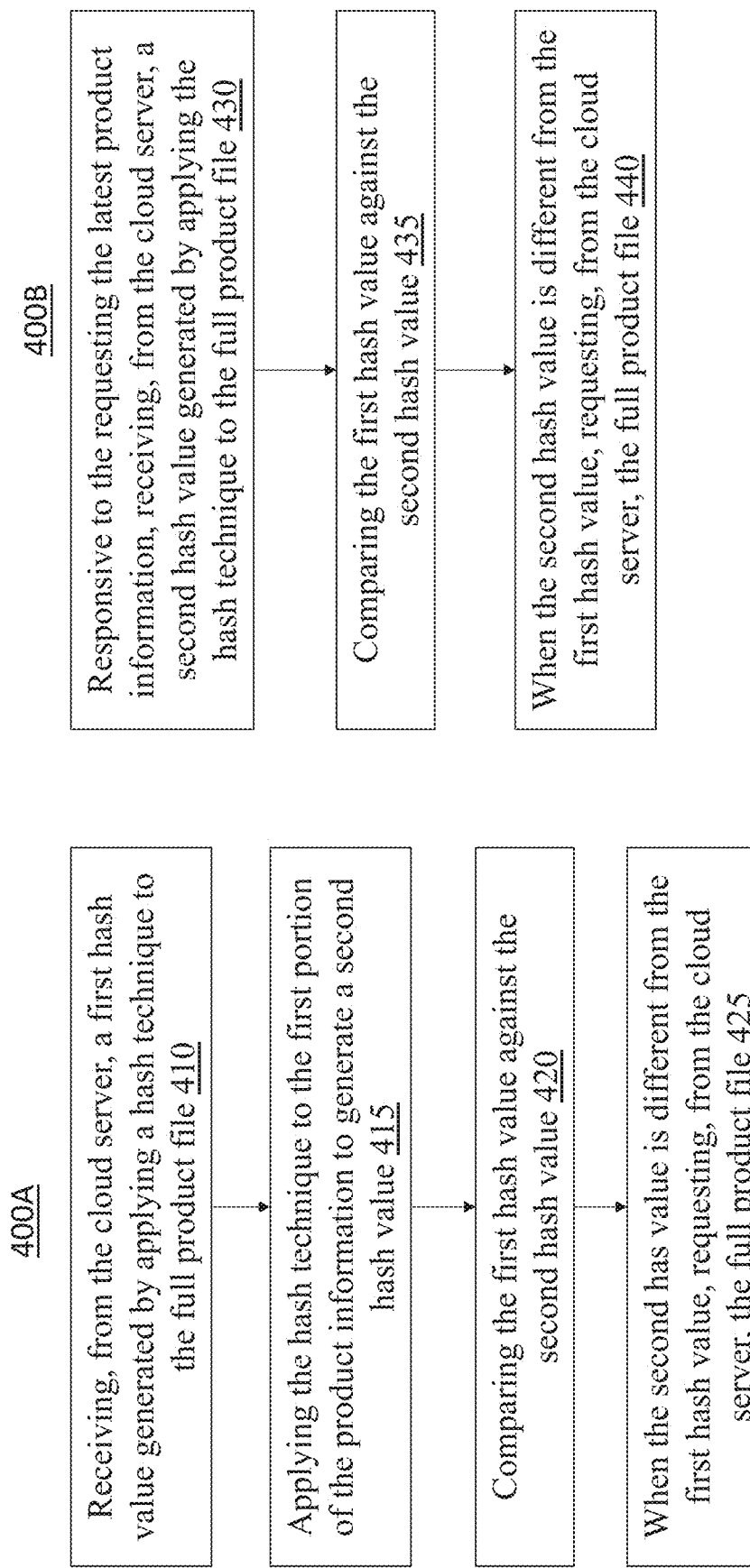
FIG. 4A is a flowchart illustrating an example method of a POS application for handling full product files.
FIG. 4B is a flowchart illustrating another example method of a POS application for handling full product files.

Accordingly, FIG. 4A illustrates a method 400A of the POS application for requesting the full product file using such a hash technique. Consider that the POS application, in the online mode, periodically communicate with the cloud server 108 to update a portion of the product information based on latest product information stored on the cloud server, where wherein the POS application is further configured to update the first portion of the product information stored locally at the POS device 102 by requesting the latest product information from the server. At step 410, the method 400A includes responsive to the requesting the latest product information, receiving, from the cloud server, a first hash value generated by the cloud server applying a hash technique to the full product file on the cloud server. At step 415, the POS application applies the same hash technique to the locally stored first portion of the product information to generate a second hash value. At step 420, the POS application compares the first hash value against the second hash value, and at step 425, when the second has value is different from the first hash value (i.e., indicating that the product information has changed), requesting, from the cloud server 108, the full product file.

FIG. 4B illustrates another method 400B of the POS application for requesting the full product file using such a hash technique. Consider that, when the POS application receives the offline packet, it can also receive a first hash value associated with the first portion of the product information and generated by the cloud server 108 by applying a hash technique to the first portion of the product information on the cloud server. Updating the first portion of the product information on the POS device 102 can then include, at step 430, responsive to the requesting the latest product information, receiving, from the cloud server, a second hash value generated by applying the hash technique to the full product file. At step 435, the POS application compares the first hash value against the second hash value, and at step 440, when the second hash value is different from the first hash value (indicating that the product information on the cloud server has changed), requesting, from the cloud server, the full product file.

Similarly for delta product files as described herein, in some cases, the cloud server 108 generates an incremental/delta product list (also sometimes referred to herein as a "delta product file" and/or a "delta product feed") when requested by the POS device 102. The cloud server 108 can also generate a hash and timestamp for the delta product file, and transmits the delta product file and its associated hash value, timestamp to the POS device 102.

In some cases, the POS device 102 can, when requesting delta product files, provide the timestamp and hash value of the last delta product file that the POS application received. The cloud server 108 can check for any newer delta product files (sometimes referred to as second, third, and/or subsequent delta product files) generated based on the timestamp given. Additionally, the cloud server 108 can skip any delta product files that have the same hash as the hash sent by the POS application. In some cases, the cloud server can perform this analysis in chronological order, i.e., the order of generation of the delta product files. When the cloud server 108 determined that there are delta product files to be sent to the POS device 102 in response to its request (e.g., that have a different hash than that sent by the POS device), the cloud server 108 can return a reference to the list of the delta product files in chronological order, the timestamps of when the delta feed was imported by the cloud server 108, and the hashes for those files. The POS device 102 can then invoke the API of the cloud server 108 to request the delta product files from the list in any suitable manner (e.g., simultaneously via multi-threading, sequentially, and/or the like). The delta product file can be used to update the previously received product information (e.g., update prices or product description, or remove unavailable products, as indicated in the delta product file, while leaving other fields/information unchanged) and update the dynamic user interface accordingly.

Figure 4C:
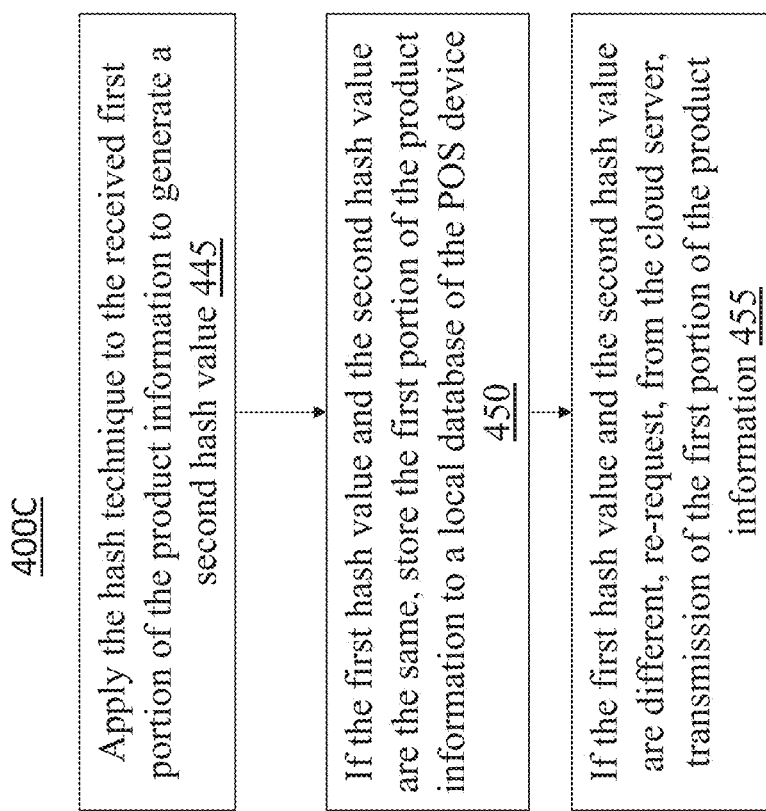
FIG. 4C is a flowchart illustrating an example method of a POS application for handling delta product files.

Accordingly, FIG. 4C illustrates a method 400C of the POS application for handling delta product files using such a hash technique. Consider that when the POS application receives the offline packet, it receives, as part of the offline packet or otherwise, a first hash value associated with the first portion of the product information and generated by the cloud server by applying a hash technique to the first portion of the product information on the server. At step 445, the POS application in the online mode) applies the hash technique to the received first portion of the product information (in the offline packet) to generate a second hash value. At step 450, if the first hash value and the second hash value are the same (i.e., the offline packet was successfully received, without any transmission errors), the POS application can store the first portion of the product information to a local database of the POS device (e.g., an SQLite™ database). At step 455, if the first hash value and the second hash value are different, indicating an error in transmission of the offline packet/product information, the POS application can re-request, from the cloud server, transmission of the first portion of the product information.

Online to Offline Transition

A network outage and/or network interruption can generally refer to outage and/or interruption in communication due to the POS device 102 being unable to communicate with the server 108, the link 121 being inoperable, and/or the server 108 being unable to communicate with the POS device 102. Said another way, a network outage and/or network interruption impairs the ability of the POS application on the POS device 102 to communicate with the server 108, in turn affects display and updating of the dynamic POS user interface, and in turn affects communication of transaction completion information to the server. A network outage can be generally characterized as a complete loss of connectivity. A network interruption can be generally characterized as intermittent connectivity. As an example, the POS device 102 may generally attempt to maintain online operation even when connectivity/bandwidth drops to 10-20% of normal levels, given the relatively small file size of SKUs and other application information when product images are not included.

Accordingly, in some cases, online mode can be characterized as the mode of operation of the POS device during the absence of network outage and/or connectivity, during the presence and/or adequate degree of communicable coupling with the desired device (e.g., the cloud server), and/or the like. Offline mode can be characterized as the mode of operation of the POS device during network outage and/or connectivity, during the absence and/or inadequate degree of communicable coupling with the desired device (e.g., the cloud server), and/or the like. Accordingly, a transition from an online state to an offline state can be based on not only the complete absence of communicable coupling, but additionally or alternatively on a decrease in extent of communicable coupling, whether in terms of bandwidth, load threshold, link error rate, and/or the like. Similarly, a transition from an online state to an offline state can be based on not only the presence of communicable coupling, but additionally or alternatively on an increase in extent of communicable coupling. During the normal course of operation (e.g., within a given day, over the course of a week, etc.), a POS device can switch between online mode and offline mode several times, during which the POS device is either coupled to the cloud server and able to communicate with it (online mode), or not (offline mode).

Continuing from the description of the online mode 102a, FIG. 2 illustrates that, at 206, the POS application on the POS device 102 can automatically and/or manually detect a network outage and/or a network interruption such as by, for example, monitoring the link 124 as described above. When the POS application detects this loss of connectivity, it can be automatically and/or manually transitioned from the online mode 102a to an offline mode 102b. In some cases, this transition is instantaneous and in real-time.

The online mode 102a and the offline mode 102b can be represented as a feature flag and/or a switch in the configuration file. In the event of a network outage and/or interruption, this feature flag and/or switch can be toggled to indicate that the POS application has switched to the offline mode 102b. This feature flag can be read by portions of the POS application to determine the mode that the application should be operating in. In some cases, the server 108 can also maintain a feature flag that reflects when the POS device 102 is offline, i.e., when the server 108 detects loss of connectivity in a manner similar to the POS device and deems that the POS device is offline.

At 206, the POS application on the POS device 102 can also perform deep linking to determine actions that the POS application can perform when in the offline mode 102b such as, for example, transactions below a predetermined transaction amount (e.g., transactions less than $20 are permitted). Some actions may be disabled in the offline mode 102b, such as, for example, requesting current tax rate(s) from the server 108 at the time of transaction execution. Which actions/features are available or unavailable in offline mode 102b can be determined by performing deep linking.

Offline Operation

Once the POS application has switched to the offline mode 102b, at 208, the POS application can use the last, locally stored (on the POS device 102) version of the configuration file and the offline packet, which includes the application data and the policy data, to run in the offline mode 102b. In the offline mode 102b, the dynamic user interface is executed as a static user interface since any updated configuration file information is not available in the offline mode. A static user interface can generally be characterized as a user interface that is wholly generated based on locally stored information on the POS device 102 and can encompass, for example, a visual indication of operating in the offline mode, disabled search features, no product images being displayed, and/or the like. This locally stored information can encompass, for example, portions of product information that were received in the first offline packet received by the POS device 102 in the online mode 102a, and portions of updated product information (e.g., product cost, shipping rates, and/or the like) that were subsequently received in online mode 102a. In this manner, a store associate can still view and browse substantially the same user interface as available when the POS device 102 entered the offline mode 102b. Further, the same application data and policy data available when the POS device 102 entered the offline mode 102b continues to be available and browsable.

Described here are additional aspects of the offline packet that permit offline mode operation. As described above, the offline packet can include, in the application data, portions of product catalog information, zip codes, promotion codes, shipping rate information, and/or the like. The offline packet can also include, in the policy data, credentials of store associates working at that particular store such as store associate logins and their hashed passwords, store manager logins and their hashed passwords, the organization structure of the employees at the store (e.g., associates and the respective managers that they report to), and/or the like. Unavailable at this time are those portions of product information, such as product images for example, that are downloaded in real-time and on-demand when in the online mode.

Accordingly, in the offline mode 102b, the store associate can continue to check out products and/or execute payment transactions using the POS application in concert with the payment device 104 and/or the payment gateway 106. For example, at 210, the associate can select the product via the user interface of the POS application, search for the product (e.g., using a SKU number), scan the product (e.g., a barcode or QR code on the product), and/or the like. Additionally, at 210, the POS application can compile the transaction information based on the selected products such as, for example, applying locally available tax information, applying locally available discount information associated with the product(s), and/or the like. If any of the transaction information is not available in offline more, the associate can manually enter that information such as, for example, a product or sale price.

Since the offline packet and updates thereto include policy data with the store associate's credentials, at 212, the associate can login to the POS application in a secure manner if not already logged in, which can be required to permit the store associate to carry out the transaction, to edit the transaction information, and/or the like. Once the associate is logged into the POS application and the transaction information is complete, at 214, the associate can swipe a credit card or a debit card at the payment device 104 to complete the transaction.

The POS application can also provide an interface (e.g., an API) for permitting some degree of configurability of the offline mode 102b at the POS device 102 such as through, for example, a Content Management System (CMS) application running on the POS device 102 or a device coupled thereto. The interface can provide for configuration of parameters such as, but not limited to, per day limit on number of transactions that can be made in offline mode, per order limit on a transaction made in offline mode, enable or disable offline mode, and/or the like. Accordingly, the POS application can check against these parameters prior to permitting execution of a transaction. For example, if a per order limit in offline mode is $200, then the POS application can disallow a store associate from executing a $250 transaction. For example, if the per day limit for transactions in offline mode is 50, then the POS application can disallow a store associate from executing a $51^{st}$ transaction. The interface/API can further provide for configuration of parameters such as store configuration, tax rate(s), product information, and order information.

The POS application can also generally provide one or more interfaces for analyzing the completed transaction information. For example, the offline packet can include an API for providing (e.g., to a CMS application) aggregate transaction completion information for transactions completed offline and stored locally, such as by store, store associate, year, quarter, month, and/or day. Example transaction completion information for a single transaction that is carried out in the offline mode 102b and is stored locally, and that can be aggregated, can include the following parameters (e.g., in JSON format): store identifier, store associate identifier, status of transaction (whether completed or failed), year of the transaction, quarter of the transaction, month of the transaction, day of the transaction, a start time for the transaction, and a transaction limit associated with the transaction. The POS application can also include an API/interface to transmit cash register activity information in the offline mode 102b to the cloud server 108, to reflect cash transactions made with the POS device 102. For example, the cash register activity information can include an identifier of the store associate making the transaction, the kind of cash register activity (e.g., "OPEN" for an opening balance in the cash register, such as when the store opens in the morning; "CASH_IN" for the amount of cash deposited in the cash register, "CASH_OUT" for the amount of cash removed from the cash register), a store identifier, and a time stamp for that cash register activity).

At 216, the completed transaction information for transactions that are made in the offline mode 102b can be stored in a database of the POS device 102, such as the SQLite™ database on the POS device, or a device coupled thereto. Generally, the database can be updated every time the POS application is initiated and/or restarted on the POS device 102. The POS application can download the updated records from the cloud server 108 as a database file via an API.

Offline to Online Transition

When connectivity is restored, at 218, the POS application can automatically and/or manually detect network connectivity as explained for transition from online to offline mode. As non-limiting examples, in some cases, the POS application/device 102 continues to attempt to ping/connect with the cloud server 108 in offline mode until detection of connectivity. In some cases, the longer the offline mode lasted, the longer satisfactory connectivity (e.g., at least 10-20% of normal bandwidth) must be maintained in order for the POS application to transition to online mode. As example values, a brief interruption in connectivity may result in an offline mode that lasts a few seconds, while a longer interruption may result in the offline mode lasting for a minute, a few minutes, or even longer.

The POS application can automatically toggle from the offline mode 102b to the online mode 102a, and/or this can be performed manually. The switch from offline to online mode 102a can serve as an event for the POS device 102 to poll and/or communicate with cloud server 108, at 218. For example, the POS application can poll the cloud server to determine if there are any updates to the configuration file, to the offline packet, to the policy data, and/or the like. If the server 108 determines that an update does exist for any of these aspects, then updated information (e.g., an updated configuration file, a delta product file, and/or the like) is sent to the POS application at 220, which can subsequently update the user interface with the updated information and then operate as described for the online mode 102a. This is generally illustrated in FIG. 2 as a "load online mobile config" step.

Subsequent Online Operation

Once the POS application switches back to the online mode 102a, at 222, the POS application can synchronize the transaction completion information for transactions completed during the offline mode 102b with the cloud server 108. For example, the transaction completion information for the offline mode 102b can be sent to the cloud server 108 as a batch. Any errors with the offline orders can be handled asynchronously by the cloud server and shown in CMS as a report. The cloud server can persist the offline orders and acknowledge the request synchronously. The cloud server can process the offline orders asynchronously and send these orders to the order management system. For example, once online mode is restored, the POS device 102 can start sending completed order/transaction information of offline orders to the cloud server 108, which can then verify/check the accuracy of each transaction. The cloud server 108 can then generate an error report of all offline transactions that had an error, including an indication of the error (e.g., tax exemption not applied, a discount not applied, a transaction for an unavailable product, and/or the like).

The cloud server 108 can reconcile the transaction completion information, including payment information, with inventory for the store associated with the POS device 102. For example, the cloud server 108 can check to ensure that the accurate product price and tax rate was applied to a transaction. As another example, the cloud server 108 can check to ensure that the quantity of a product sold to a customer as part of a transaction was actually available at the store associated with the POS device 102. When the cloud server 108 reconciles all transactions, at 224, the cloud server can transmit an indication of successful reconciliation of the transaction completion information to the POS application. At 226, the POS application can then delete the transaction completion information from its previous offline mode 102b from the SQLite™ database.

Re-entering the online mode can also result in switching the user interface back from a static user interface to a dynamic user interface. For example, in some cases, re-entering the online mode can result in the cloud server 108 sending the POS device 102 an updated configuration file, which can then be used to re-render/update the static user interface employed in the offline mode to the dynamic user interface based on the updated configuration file, latest portions of product information received from the cloud server, additional portions (e.g., product images) of product information now available, and/or the like.

While FIG. 1 shows one POS device 102 and one payment device 104, the system 100 can include several POS devices such as the device 102. Each POS device can be communicably coupled to the cloud server 108. Irrespective of whether these POS devices are in the same store or in different stores, each of these POS devices can operate independently of each other as described in FIG. 2, and can interact with the server 108 independently. In this manner, in the scenario where multiple POS devices (e.g., within a store) transition back to the online mode simultaneously, each POS device can simultaneously and immediately communicate with the cloud server 108.

In some cases, a mesh network may be formed between the POS devices, such that a designated POS device can communicate with the server 108 and then do a local network broadcast (e.g., of the application information, offline packet, product images, and/or the like). The designated POS device can be designated so based on, for example, based on workload (e.g., a POS device that is currently not in use). In some cases, the designated POS device can be designated so based on a predetermined hierarchy between the POS devices.

Example

This example provides some detail (prerequisites, conditions, operation, etc.) for a POS application running on a mobile device (e.g., iPhone, iPad, and/or the like, similar to the device 102) in both online and offline mode as described herein, in a store setting. Here, the POS application can be considered to be offline if the mobile device is not connected to the store network (e.g., WiFi, and/or Ethernet, considered a local network failure), or if the Internet service is inoperational (e.g., a service from a provider such as Xfinity, considered an external network failure).

FIG. 3A illustrates how, if desired, operation of the POS application in offline mode can be enabled, or completely disabled (i.e., the POS application does not provide any offline functionality such as limited transactions, etc.), by toggling a setting within the POS application and/or a CMS employed to configure the POS application. FIG. 3A illustrates that offline mode operation is enabled.

FIG. 3B illustrates another interface of the POS application and/or the CMS that can be used to configure operation in offline mode. Similar to FIG. 3A, a switch 310 can be used to enable or disable offline mode operation. Enabling offline mode operation when the POS application is online can also result in the POS application communicating with the cloud server (e.g., the server 108) to set up for offline operation. This can include, but is not limited to, requesting the offline packet from the cloud server, setting up regular synchronization of product information with the cloud server, setting up regular synchronization of tax information with the cloud server, and/or the like. A setting 315 ("Offline Database Refresh Time") can be programmed to select the periodicity of synchronization of such product, tax, and other information when the POS application is online, illustrated here to be about 3600 seconds, or every 60 minutes.

Another setting 320 ("Transaction Amount") can be programmed to set the maximum permissible amount of a transaction in the offline mode, illustrated here to be $500. Another setting 325 ("Daily Transaction Amount") can be programmed to set the maximum permissible amount of all transactions in one day (or some other predetermined duration) that can be accepted, illustrated here to be $5000 (also sometimes referred to as the "total transaction amount"). Another setting 330 ("Percent off price override") can be programmed to set the maximum percentage of permissible price overrides for a product or transaction, say by a Store Associate or Store Manager), when operating in offline mode.

In offline mode, some settings are associated with how the POS application monitors whether connectivity has been restored, such that it can transition back to online mode. For example, the setting 335 ("start online detection") can be programmed to set the elapsed time, after switching to offline mode, that the POS application will resume detection of connectivity in an attempt to revert to online mode (e.g., by pinging the cloud server), illustrated here as 30 seconds. As another example (not shown), a "ping interval" setting can be programmed to specify the time interval between pings to the cloud server when in offline mode. As yet another example (not shown), a "successful ping" setting can be programmed to specify how many consecutive pings to the cloud server must be successful (i.e., receive a response from the cloud server) before the POS application can switch from offline mode to online mode.

Additional settings in the POS application and/or the CMS can include, but are not limited to, specifying the types of transactions permissible when offline (e.g., verifiable Europay, MasterCard® and Visa® (EMV) transactions, unverifiable store-and-forward transactions, and/or the like), the types of payment cards acceptable for payment (e.g., for a particular user, all or some of the credit and/or debit cards associated with their account), a transaction limit for a particular mobile device to limit the number of transactions performed on that device per offline mode/session (this can be reset when that mobile device re-enters online mode), an offline swipe limit for a maximum amount that can be charged to a single payment card per swipe, a floor limit for a maximum value of an unverifiable store-and-forward transaction when in offline mode, and/or the like.

Figure 3C:
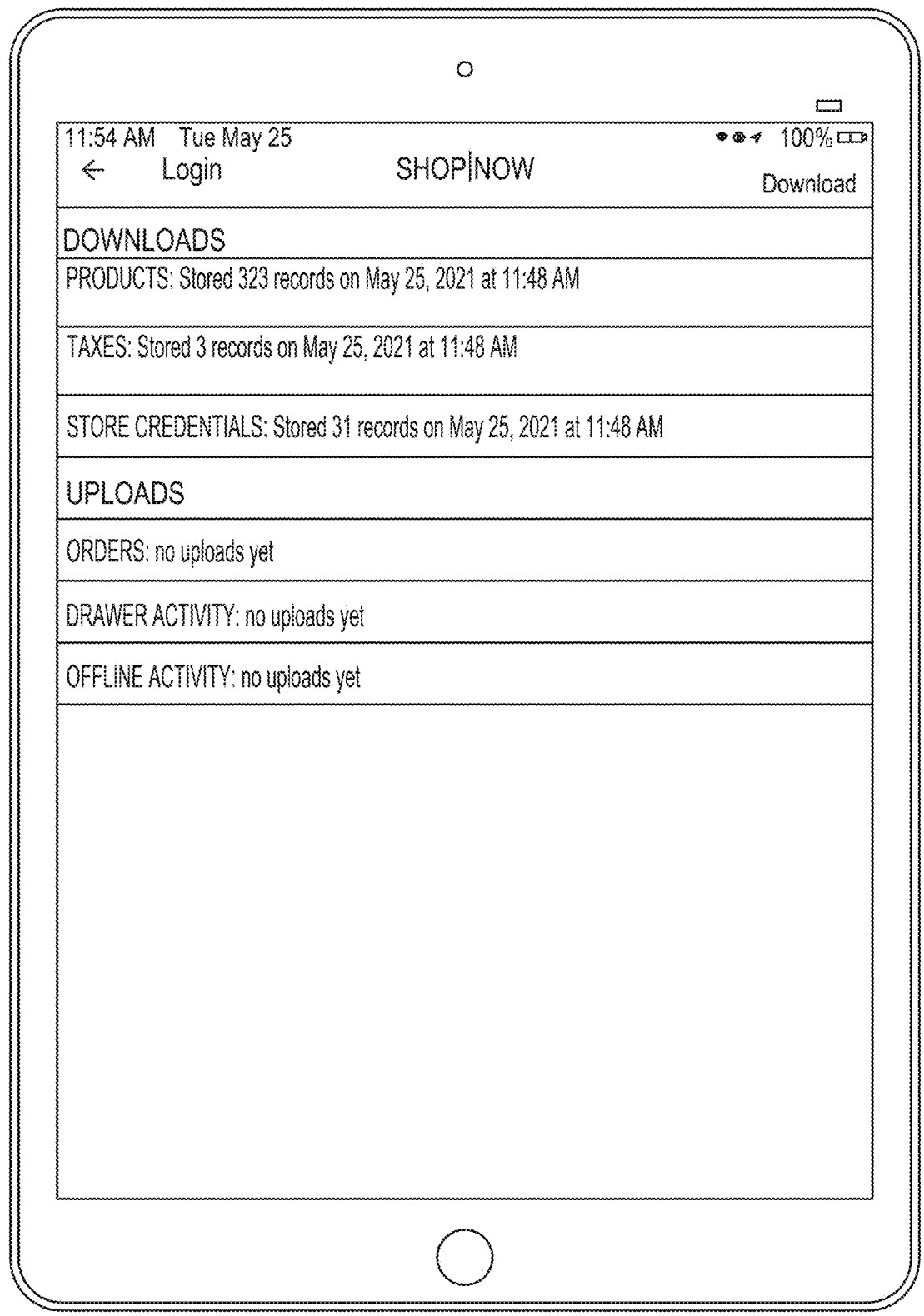
FIG. 3C is an example interface illustrating download status for various application data by a POS application.

The POS application can be required to run in online mode at least once, and to download some information/data (e.g., as part of an offline packet or otherwise) from the cloud server to be able to operate in offline mode. This information/data can include any of the application data as disclosed herein such as, for example, product data, policy data (e.g., credentials for store associates and/or managers), tax data, and/or the like. FIG. 3C illustrates an example interface of the POS application that can indicate to a Store Manager that (here) product information for 1344 products and three tax rates were successfully downloaded and stored to the device, while download of the policy data ("store credentials") has begun but not committed to the local database yet.

In some cases, the transition of the POS from online mode to offline mode can be automatic, such as based on detection of lack of network connectivity, internet connectivity (i.e., detecting service outage), and/or the like, as generally described for step 206 of FIG. 2. In some cases, the transition of the POS from online mode to offline mode can be carried out manually, which is useful in circumstances where the Store Associate/Manager knows that the store WiFi Internet, etc. is inoperational.

In some cases, the transition of the POS from offline mode to online mode can be automatic, such as based on detection of restoration of network connectivity, internet connectivity (i.e., detecting service outage), and/or the like, as generally described for step 218 of FIG. 2. In some cases, the transition of the POS from offline mode to online mode can be carried out manually, which is useful in circumstances where the Store Associate/Manager knows that the store WiFi Internet, etc. is operational but the POS application is unable to detect this.

Figure 3D:
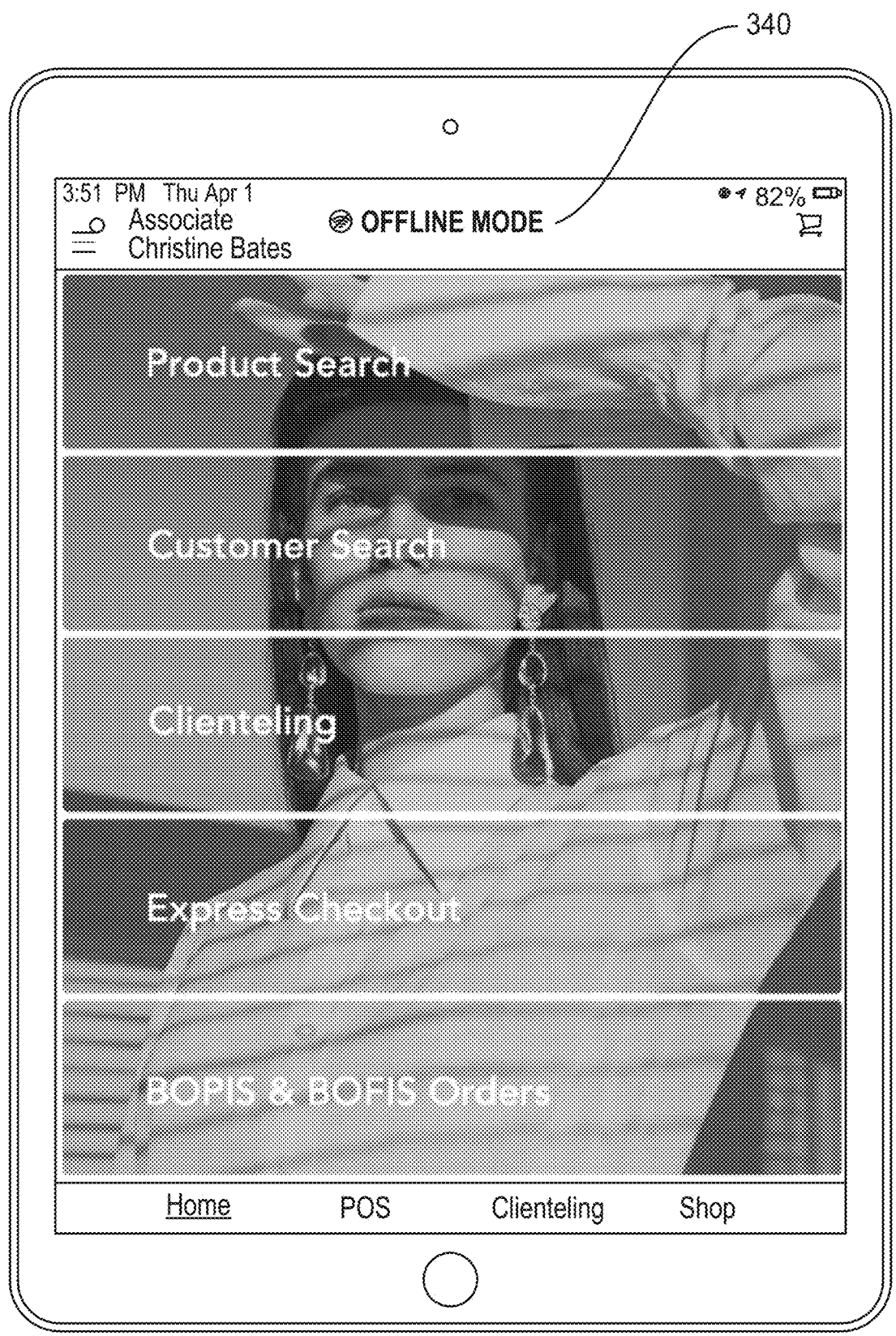
FIG. 3D is an example interface illustrating a home page of a POS application operating in offline mode.

FIG. 3D illustrates an example interface of the POS application when operating in the offline mode, as indicated by the field 340. As also illustrated in FIG. 3D and explained herein with reference to FIGS. 1-2, some aspects of the user interface can be available online, such as the home page/screen illustrated in FIG. 3D.

Figure 3E:
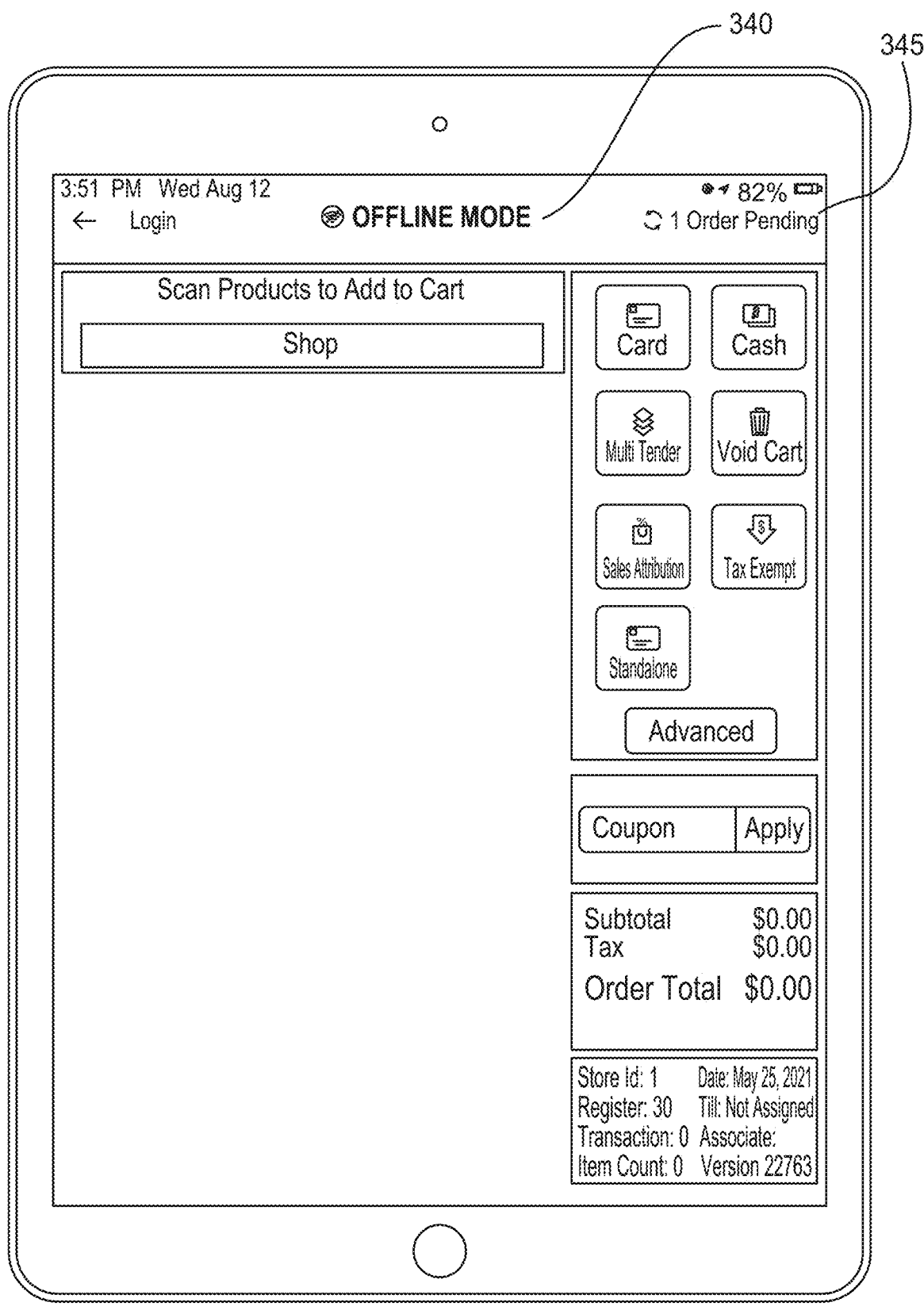
FIG. 3E is an example interface illustrating another page of a POS application operating in offline mode, and further illustrating pending synchronization of transactions/orders completed online.

FIG. 3E illustrates another example interface of the POS application during the offline mode, and shows a field 345 that indicates the number of completed orders/transactions that are pending synchronization, for when the POS application re-enters online mode. When the POS application returns to online mode, it can provide an "Offline Orders/Pending Orders" deeplink to list all orders placed during the offline mode, including those that are pending synchronization with the cloud server. The POS application can further provide the option to manually synchronize the pending offline orders with the cloud server, in the event this does not automatically occur when the POS application enters the online mode.

Figure 3F:
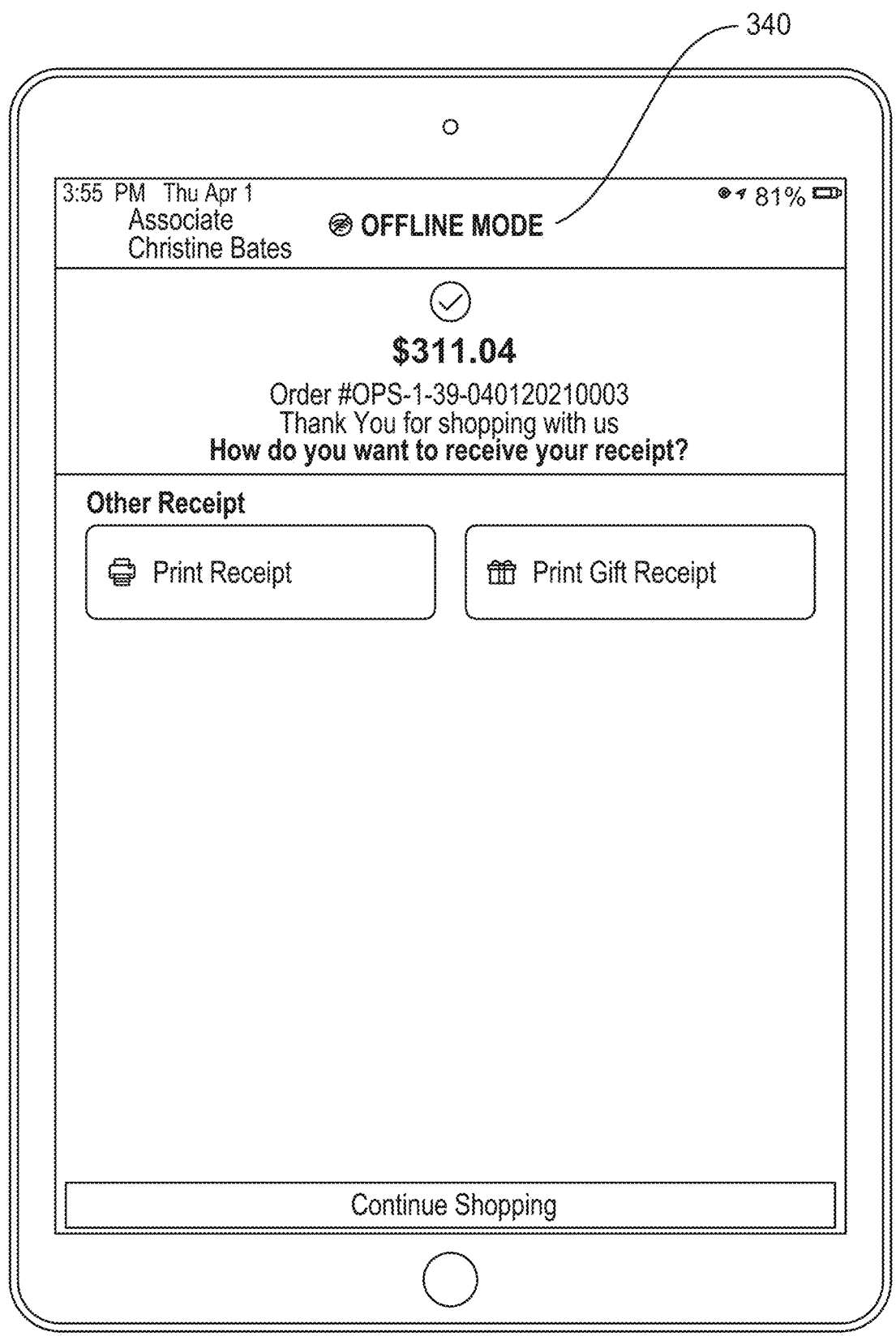
FIG. 3F is an example interface illustrating another page of a POS application operating in offline mode, and further illustrating completion of a transaction during the offline mode.

FIG. 3F illustrates another example interface of the POS application during the offline mode, and shows completion of a transaction during the offline mode. The receipt options listed here can include options to print a receipt and/or to print a gift receipt (e.g., such as via a printer connected to the mobile device via Bluetooth), and do not include the option to email a receipt. However, as listed in Table 3 below, in some cases, emailing of gift receipts can be made available during the offline mode, with the email being sent when the POS application re-enters the online mode.

Table 3 is an example, non-limiting list of features/functionality of the POS application with an indication of whether each feature can be available/supported, partially available/supported, or unavailable/unsupported for each of the online mode and the offline mode. It is understood though, that any feature/function that is fully supported in offline mode can instead be partially supported in offline mode, and that any feature/function partially or fully supported in offline mode can instead be unsupported (e.g., via settings of the POS application) in the offline mode.

TABLE 3

| Feature/Function | Online Mode | Offline Mode |
|---|---|---|
| Associate/Manager login | Supported | Supported |
| Clienteling (e.g., retrieving and/or updating sensitive client data such as shipping addresses) | Supported | Not Supported |
| Loyalty (e.g., points for purchases can be earned in offline mode, but can't be redeemed) | Supported | Partially Supported |
| Product Catalog Browsing | Supported | Supported |
| Add to Cart by Scanning Product Barcode | Supported | Supported |
| Credit Card Transactions | Supported | Supported |
| Cash Transactions | Supported | Supported |
| Printed Receipts | Supported | Supported |
| Emailed Receipts | Supported | Supported (sent after transaction is synced in online mode) |
| Gift Cards | Supported | Not Supported |
| Tax Rates | Supported | Supported |
| Manual Tax Override | Supported | Not Supported |
| Manual Price Override | Supported | Supported |
| Coupons (e.g., coupon codes, that may require verification) | Supported | Not Supported |
| Promotional Rates | Supported | Partially/fully Supported (e.g., via manual override by a store associate/manager) |
| Suspend Shopping Cart | Supported | Not Supported |
| Void Shopping Cart before Payment | Supported | Supported (not saved to local database after return to online mode) |
| Returns/Exchanges | Supported | Supported |
| Order History | Supported | Not Supported |
| Till Management | Supported | Supported |
| Till History | Supported | Supported |
| Safe Management | Supported | Not Supported |
| Store Close/Bank Deposit | Supported | Not Supported |
| Inventory Management | Supported | Not Supported |

TABLE 3-continued

| Feature/Function | Online Mode | Offline Mode |
|---|---|---|
| Associate Analytics/Dashboard (e.g., associate sales performance information) | Supported | Not Supported |

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. In a system comprising a cloud server and a payment device, a point-of-sale (POS) device communicably coupleable to the cloud server and to the payment device, the POS device comprising: a database; and a processor executing a POS application, the POS application configured to: in an online mode during which the POS device is communicably coupled to the cloud server: receive a configuration file and an offline packet from the cloud server, the configuration file including layout information, the offline packet including a first portion of product information associated with a set of products; and render a dynamic user interface on a display of the POS device based on the configuration file and the offline packet, including rendering a portion of the dynamic user interface by: requesting, from the cloud server, a second portion of the product information associated with the set of products; receiving, from the cloud server, the second portion of the product information associated with the set of products; and rendering the portion of the dynamic user interface based on the first portion of the product information and the second portion of the product information; detect loss or reduction in extent of communicable coupling with the cloud server; and enter an offline mode in response to the detecting the loss or reduction in extent of communicable coupling with the cloud server; and in the offline mode: re-render the dynamic user interface as a static user interface based on the configuration file, the offline packet, and the first portion of the product information, such that no requests for additional portions of the product information are made to the cloud server when the POS device is in the offline mode; execute, in concert with the payment device, at least one transaction associated with a first product of the set of products to generate transaction completion information; store the transaction completion information in the database; and detect restoration or increase in extent of communicable coupling with the cloud server; re-enter the online mode in response to the detecting the restoration or increase in extent of the communicable coupling with the cloud server; and transmit the transaction completion information to the cloud server for synchronization.

2. The POS device of claim 1, wherein the second portion of the product information includes, for at least one product of the one or more products, a product image.

3. The POS device of claim 1, wherein the POS application is configured to detect the loss or reduction in extent of communicable coupling with the cloud server by detecting a reduction in link bandwidth to below a predetermined bandwidth threshold between the POS device and the cloud server.

4. The POS device of claim 1, wherein the POS application is configured to detect the loss or reduction in extent of communicable coupling with the cloud server by detecting an increase in link load to above a predetermined load threshold between the POS device and the cloud server.

5. The POS device of claim 1, wherein the POS application is configured to detect the loss or reduction in extent of communicable coupling with the cloud server by detecting an increase in link error rate to above a predetermined link error rate threshold between the POS device and the cloud server.

6. The POS device of claim 1, wherein the transaction is a first transaction, wherein the POS application is further configured to, in the online mode:
execute, in concert with the payment device, a second transaction associated with a second product of the set of products to generate second transaction completion information; and
transmit the second transaction completion information to the cloud server in real-time.

7. The POS device of claim 1, wherein the POS application is further configured to, after re-entering the online mode:
receive, from the cloud server, an indication of success of synchronization of the transaction completion information; and
delete the transaction completion information from the database.

8. The POS device of claim 1, wherein the POS application is further configured to, in the online mode, periodically communicate with the cloud server to update the first portion of the product information based on latest product information stored on the cloud server.

9. The POS device of claim 8, wherein the POS application is further configured to update the first portion of the product information by:
requesting, from the cloud server, the latest product information;
receiving, from the cloud server, a full product file responsive to the request for the latest product information; and
replacing the first portion of the product information with product information from the full product file.

10. The POS device of claim 9, wherein the POS application is further configured to update the first portion of the product information by:
responsive to the requesting the latest product information, receiving, from the cloud server, a first hash value generated by applying a hash technique to the full product file;
applying the hash technique to the first portion of the product information to generate a second hash value; and
comparing the first hash value against the second hash value; and
when the second has value is different from the first hash value, requesting, from the cloud server, the full product file.

11. The POS device of claim 9, wherein the receiving the offline packet further includes receiving a first hash value associated with the first portion of the product information and generated by the cloud server by applying a hash technique to the first portion of the product information, wherein the POS application is further configured to update the first portion of the product information by:
responsive to the requesting the latest product information, receiving, from the cloud server, a second hash value generated by applying the hash technique to the full product file;
comparing the first hash value against the second hash value; and
when the second hash value is different from the first hash value, requesting, from the cloud server, the full product file.

12. The POS device of claim 8, wherein the POS application is further configured to update the first portion of the product information by:
requesting, from the cloud server, the latest product information;
receiving, from the cloud server, a delta product file responsive to the request for the latest product information, the delta product file reflecting changes to the first portion of the product information; and
updating the first portion of the product information based on the delta product file to generate updated product information.

13. The POS device of claim 12, wherein the delta product file is a first delta product file, and wherein the POS application is further configured to update the updated product information by:
receiving, from the cloud server, a second delta product file responsive to a subsequent request for latest product information; and
updating the updated product information based on the second delta product file to generate second updated product information.

14. The POS device of claim 13, wherein the POS application is further configured to transmit, as part of the subsequent request, to the cloud server, a first timestamp associated with the first delta product file, wherein the receiving the second delta product file is upon the determination, by the cloud server, that a second timestamp associated with the second delta product file is different from the first timestamp.

15. The POS device of claim 13, wherein the POS application is further configured to transmit, as part of the subsequent request, to the cloud server, a first hash value associated with the first delta product file and based on applying a hash technique to the first delta product file, wherein the receiving the second delta product file is upon the determination, by the cloud server, that a second hash value associated with the second delta product file and based on applying the hash technique to the second delta product file is different from the first hash technique.

16. The POS device of claim 1, wherein the receiving the offline packet further includes receiving a first hash value associated with the first portion of the product information and generated by the cloud server by applying a hash technique to the first portion of the product information, wherein the POS application is further configured to, in the online mode:
apply the hash technique to the received first portion of the product information to generate a second hash value;
if the first hash value and the second hash value are the same, store the first portion of the product information to a local database of the POS device; and
if the first hash value and the second hash value are different, re-request, from the cloud server, transmission of the first portion of the product information.

17. The POS device of claim 1, wherein the POS application is further configured to, upon the re-entering the online mode:
receive an updated configuration file from the cloud server; and
re-render the static user interface as a second dynamic user interface based on the updated configuration file.

18. The POS device of claim 1, wherein the configuration file is a first configuration file, wherein the POS application is further configured to, when in the online mode:
receive, from the cloud server, a second configuration file including layout information different from the layout information of the first configuration file; and
re-render the dynamic user interface based on the second configuration file.

19. The POS device of claim 1, wherein the POS application is further configured to execute the at least one transaction in the offline mode when a transaction amount associated with the at least one transaction is below a predetermined threshold.

20. The POS device of claim 1, wherein the at least one transaction is a first transaction of a set of transactions executed by the POS application in the offline mode, wherein the POS application is further configured to execute the at least one transaction when a total transaction amount associated with the set of transactions is collectively below a predetermined threshold for a predetermined duration.

21. The POS device of claim 1, wherein the at least one transaction is a first transaction of a set of transactions executed by the POS application in the offline mode, wherein the POS application is further configured to execute the at least one transaction when a number of transactions of the set of transactions is below a predetermined threshold.

22. A method of a point-of-sale (POS) device communicably coupleable to a cloud server and to a payment device, the method comprising: in an online mode during which the POS device is communicably coupled to the cloud server: receiving a configuration file and an offline packet from the cloud server, the configuration file including layout information, the offline packet including a first portion of product information associated with a set of products; and rendering a dynamic user interface on a display of the POS device based on the configuration file and the offline packet, including rendering a portion of the dynamic user interface by: requesting, from the cloud server, a second portion of the product information associated with the set of products; receiving, from the cloud server, the second portion of the product information associated with the set of products; and rendering the portion of the dynamic user interface based on the first portion of the product information and the second portion of the product information; detecting loss or reduction in extent of communicable coupling with the cloud server; and entering an offline mode in response to the detecting the loss or reduction in extent of communicable coupling with the cloud server; and in the offline mode: re-rendering the dynamic user interface as a static user interface based on the configuration file, the offline packet, and the first portion of the product information, such that no requests for additional portions of the product information are made to the cloud server when the POS device is in the offline mode; executing, in concert with the payment device, at least one transaction associated with a first product of the set of products to generate transaction completion information; store the transaction completion information in the database; and detecting restoration or increase in extent of communicable coupling with the cloud server; re-entering the online mode in response to the detecting the restoration or increase in extent of the communicable coupling with the cloud server; and transmitting the transaction completion information to the cloud server for synchronization.

23. The method of claim 22, wherein the second portion of the product information includes, for at least one product of the one or more products, only one or more product image associated with the at least one product.

24. The method of claim 22, the detecting the loss or reduction in extent of communicable coupling with the cloud server further including detecting one or more of:
a reduction in link bandwidth to below a predetermined bandwidth threshold between the POS device and the cloud server;
an increase in link load to above a predetermined load threshold between the POS device and the cloud server; or
an increase in link error rate to above a predetermined link error rate threshold between the POS device and the cloud server.

25. The method of claim 22, further comprising, in the online mode, periodically communicating with the cloud server to update the first portion of the product information based on latest product information stored on the cloud server.

26. The method of claim 25, the updating the first portion of the product information further including:
requesting, from the cloud server, the latest product information;
receiving, from the cloud server, a delta product file responsive to the request for the latest product information, the delta product file reflecting changes to the first portion of the product information; and
updating the first portion of the product information based on the delta product file to generate updated product information.

27. The method of claim 26, wherein the delta product file is a first delta product file, and the updating the updated product information further including:
receiving, from the cloud server, a second delta product file responsive to a subsequent request for latest product information; and
updating the updated product information based on the second delta product file to generate second updated product information.

28. The method of claim 27, further comprising transmitting, as part of the subsequent request, to the cloud server, a first timestamp associated with the first delta product file, wherein the receiving the second delta product file is upon the determination, by the cloud server, that a second timestamp associated with the second delta product file is different from the first timestamp.

29. The method of claim 27, further comprising transmitting, as part of the subsequent request, to the cloud server, a first hash value associated with the first delta product file and based on applying a hash technique to the first delta product file, wherein the receiving the second delta product file is upon the determination, by the cloud server, that a second hash value associated with the second delta product file and based on applying the hash technique to the second delta product file is different from the first hash technique.

30. The method of claim 22, further comprising executing the at least one transaction in the offline mode when a transaction amount associated with the at least one transaction is below a predetermined threshold.

31. The method of claim 22, wherein the at least one transaction is a first transaction of a set of transactions executed by the POS application in the offline mode, further comprising executing the at least one transaction when a total transaction amount associated with the set of transactions is collectively below a predetermined threshold for a predetermined duration.

32. The method of claim 22, wherein the at least one transaction is a first transaction of a set of transactions executed by the POS application in the offline mode, further comprising executing the at least one transaction when a number of transactions of the set of transactions is below a predetermined threshold.

33. A non-transitory computer-readable medium storing instructions of a point-of-sale (POS) device communicably coupleable to a cloud server and to a payment device that, when executed by one or more processors, cause the one or more processors to: in an online mode during which the POS device is communicably coupled to the cloud server: receive a configuration file and an offline packet from the cloud server, the configuration file including layout information, the offline packet including a first portion of product information associated with a set of products; and render a dynamic user interface on a display of the POS device based on the configuration file and the offline packet, including rendering a portion of the dynamic user interface by: request, from the cloud server, a second portion of the product information associated with the set of products; receive, from the cloud server, the second portion of the product information associated with the set of products; and render the portion of the dynamic user interface based on the first portion of the product information and the second portion of the product information; detect loss or reduction in extent of communicable coupling with the cloud server; and enter an offline mode in response to the detecting the loss or reduction in extent of communicable coupling with the cloud server; and in the offline mode: re-render the dynamic user interface as a static user interface based on the configuration file, the offline packet, and the first portion of the product information, such that no requests for additional portions of the product information are made to the cloud server when the POS device is in the offline mode; execute, in concert with the payment device, at least one transaction associated with a first product of the set of products to generate transaction completion information; store the transaction completion information in the database; and detect restoration or increase in extent of communicable coupling with the cloud server; re-enter the online mode in response to the detecting the restoration or increase in extent of the communicable coupling with the cloud server; and transmit the transaction completion information to the cloud server for synchronization.

* * * * *